US00RE34191E

United States Patent [19]

Brown

[11] E Patent Number: Re. 34,191

[45] Reissued Date of Patent: Mar. 9, 1993

[54] PROCESS FOR ELECTROPLATING METALS

[75] Inventor: Craig J. Brown, Pickering, Canada

[73] Assignee: Eco-Tec Limited, Pickering, Canada

[21] Appl. No.: 756,257

[22] Filed: Sep. 6, 1991

Related U.S. Patent Documents

Reissue of:

[64] Patent No.: 4,906,340
Issued: Mar. 6, 1990
Appl. No.: 359,298
Filed: May 31, 1989

[51] Int. Cl.[5] ..... C25D 17/00; C25D 21/00

[52] U.S. Cl. ..... 205/96; 204/105 R; 204/234

[58] Field of Search ..... 204/14.1, 234, 237

[56] References Cited

U.S. PATENT DOCUMENTS 4,778,572 10/1988 Brown ..... 205/96

FOREIGN PATENT DOCUMENTS 0073186 3/1983 European Pat. Off. .

*Primary Examiner*—T. M. Tufariello
*Attorney, Agent, or Firm*—Bereskin & Parr

[57] ABSTRACT

A process for electroplating metals in an electroplating cell in which the anode current efficiency of the cell is greater than the cathode current efficiency. Buildup of excess metal in the cell is counteracted by circulating the plating solution through an electrowinning cell and plating out the excess metal onto cathodes in the electrowinning cell. The amount of current flowing through the electrowinning cell is controlled so that the amount of the said current which results in the deposition of metal is at least substantially equal to the amount of current flowing through the electroplating cell which results in the evolution of hydrogen gas.

15 Claims, 2 Drawing Sheets

PROCESS FOR ELECTROPLATING METALS

Matter enclosed in heavy brackets [ ] appears in the original patent but forms no part of this reissue specification; matter printed in italics indicates the additions made by reissue.

FIELD OF THE INVENTION

This invention relates generally to a process for electroplating metals. More particularly, the invention is concerned with an electroplating process which can be performed in an electroplating cell having greater anode current efficiency greater than cathode current efficiency.

In the context of the present invention, the term "current efficiency" in relation to an electrode has its normal meaning in the art, namely the ratio of the useful current transferred between the electrode and the electrolyte to the current supplied to the electrode (usually expressed as a percentage).

BACKGROUND OF THE INVENTION

Electroplating of metals is well known. A workpiece capable of conducting an electric current is immersed in a bath containing a solution of metallic salts. A cathodic charge is imparted to the workpiece by means of a source of direct electric current. A thin layer of metal contained in the solution is thus deposited on the surface of the workpiece. A counter-electrode or anode is required in the bath. The anode may be soluble, in which case it is usually the same type of metal as is being deposited. Theoretically, metal is dissolved from the anode at the same rate as it is deposited at the cathode. Alternately, the anode may be an insoluble type. In this case the anode material does not dissolve. The result of the anodic reaction is the generation of gas. Where metallic sulfate solutions are employed, the gas is predominantly oxygen. Where appreciable concentrations of chloride are present, chlorine gas may also evolve.

U.S. Pat. No. 4,778,572 to Brown (the disclosure of which is incorporated herein by reference) indicates that, for plating processes such as zinc and nickel using soluble anodes, the anodic current efficiency is virtually 100%, meaning that essentially no gas is evolved from the anode and all the electrical current passing through the anode results in the dissolution of metal from the anode. At the cathode, the situation is somewhat different. Typically, a small, but significant percentage of the current passing through the cathode results in the production of hydrogen gas instead of metal. Normally the cathodic current efficiency varies between 90–98% in terms of metal deposition.

A difference between anode and cathode current efficiencies causes metal to dissolve from the anode faster than it plates onto the cathode. This leads to a build up in the concentration of dissolved metal in the bath solution. Eventually the dissolved metal concentration rises to the point where it is deleterious to the plating process and solution must be decanted from the plating bath and replaced with water to reduce the concentration to an acceptable level.

Coincidental with the rise in metal concentration in the electroplating solution is an increase in pH. The pH of the solution is a critical factor in maintaining satisfactory performance of the electroplating process. Rising pH is normally counteracted through regular additions of acid to maintain a constant pH in the bath.

Excess metal bearing solution decanted from an electroplating bath is environmentally hazardous and must be disposed of in an environmentally safe manner. The conventional means of disposing of such metal bearing wastes is to raise the pH with an alkali such as sodium hydroxide or lime and precipitate the metals as metal hydroxide sludge. This process is very expensive to operate and results in the generation of large quantities of solid waste which must be disposed of. Disposal of solid waste is becoming increasingly difficult and expensive. Moreover, the loss of metal value is significant.

A more attractive way to dispose of the excess solution is to electrolytically treat the solution in an electrowinning cell to recover the metal. The electrowinning cell is equipped with insoluble anodes and cathodes whereupon metal is deposited. This procedure is commonly practised in the electrolytic refining of copper. Metallic impurities build up in the copper containing electrolytes, necessitating bleeding off a certain volume of solution. Most of the copper in this solution is plated out in electrowinning cells in a procedure known in the industry as "de-copperization". The remaining solution is then disposed of. By this procedure, the copper concentration of the solution is typically reduced from more than 50 g/L to less than 10 g/L.

A similar procedure is followed in electrolytic zinc plants, where electrolyte is sometimes purged from the system because of a build up of manganese impurities. The zinc concentration in the solution is reduced in so-called "stripping" cells prior to final neutralization and disposal. Unfortunately, with this technique it is only possible to reduce the zinc concentration to a level of 10–20 g/L, so that a considerable quantity of zinc remains in solution.

There are a number of difficulties with this process:

As the metal is deposited at the cathode of the electrowinning cell, acid is generated at the anode and the pH of the solution drops. While copper can be plated from highly acidic solutions to a relatively low concentration, other metals such as nickel, zinc and iron will not electroplate efficiently under highly acidic conditions. To avoid this problem with these other metals, it is necessary to continuously adjust the pH upwards through addition of an alkali such as sodium hydroxide. The cost of the alkali consumed in this process is appreciable and for that reason this process is unattractive.

As the concentration of metal decreases in the electrowinning solution, the rate at which metal ions diffuse to the surface of cathode decreases, as there is less driving force for this diffusion. For a given current density, eventually a point is reached where the rate of metal deposition at the cathode is greater than the rate of metal diffusion to the surface of the cathode and concentration of metal in the solution immediately adjacent to the cathode will decrease well below the concentration in the bulk solution. This phenomenon is known as concentration polarization. Concentration polarization results in a deterioration of the quality of the deposit. Instead of a smooth adhering deposit, a powdery, poorly adhering deposit is produced. In some cases, dendrites will grow from the cathode and short circuit against the anode. In addition the cathodic current efficiency will be reduced as hydrogen gas begins evolving instead of metal deposition. To avoid concentration polarization it is necessary to reduce the current density in proportion to the reduction in the metal concentration. This increases the size of the electrowinning cell required to remove a given quantity of metal. It is not in fact practical to reduce the metal concentration to the level where the solution would be acceptable for discharge to the environment and supplemental conventional precipitation treatment of the solution after electrowinning would be necessary. For this reason only a portion of the metal can be recovered.

If the plating solution contains significant quantities of chloride ions, chlorine gas will evolve at the insoluble anode in addition to, or instead of oxygen. Chloride ions are very corrosive to most common insoluble anode materials, such as lead, and chlorine gas is highly toxic. Provision must be made in the design of the electrowinning cell to handle the chlorine gas generated.

Thus it can be readily seen that use of an electrowinning cell in the usual manner is not a viable means of dealing with the problem of metal concentration buildup in the electroplating bath.

The Brown '572 patent (supra) teaches one way to solve the problem of increasing metal concentration in the electroplating bath. By this method a small percentage of the soluble anodes in the electroplating bath are replaced with insoluble anodes. The quantity of insoluble anode material is selected so that the overall anode efficiency in terms of metal dissolution is equal to the cathode metal deposition efficiency. Consequently, metal dissolves from the anodes at the same rate that it deposits on the cathodes and no buildup occurs.

In some soluble anode plating processes it is not feasible to install a small percentage of insoluble anode material as taught in the aformentioned patent. For example, in the so-called "electro-galvanizing" process, strip steel is continuously plated with metals such as zinc, zinc-iron, or zinc-nickel alloy. The current densities are extremely high and the geometry of the anode is critical to achieving an even current distribution at low operating voltage.

SUMMARY OF THE INVENTION

An object of the present invention is to provide an improved electroplating process which is capable of accommodating differences between anode current efficiency and cathode current efficiency in the an electroplating cell without the use of supplementary insoluble anode material in the electroplating cell.

Accordingly, the present invention provides a process for electroplating metals in an electroplating cell comprising a bath containing a plating solution of a metallic salt, a cathode comprising a workpiece to be plated, and a soluble anode, and in which the anode current efficiency of the cell is greater than the cathode current efficiency. The process includes the steps of providing an electrowinning cell which includes at least one insoluble anode, at least one insoluble cathode and a bath which communicates with the bath of the electroplating cell for permitting circulation of the plating solution between the cells. A source of direct electric current is connected to the anode and cathode of the electroplating cell so a to cause electroplating of metal onto the workpiece. A second source of direct current is connected across the anode and cathode of the electrowinning cell so as to cause deposition of metal from the plating solution onto the cathode. The plating solution is circulated between the cells and the amount of current flowing through the electrowinning cell which results in the deposition of metal is controlled to be at least substantially equal to the amount of current flowing through the electroplating cell which results in the evolution of hydrogen gas.

By controlling the current flowing in the electrowinning cell in this way, the rate of metal deposition in the electrowinning cell is substantially the same as the rate of dissolved metal buildup in the electroplating cell solution. Accordingly, the buildup in the electroplating cell will be counteracted by a depletion of metal in the electrowinning cell. Circulation of the plating solution between the two cells will substantially avoid excess metal buildup in the electroplating cell.

The metal that has been deposited on the cathode in the electrowinning cell can be recovered and re-used as anode material in the electroplating cell, or sold to recoup its value.

It is not possible to utilize the process of the Brown paten (supra) when electroplating more noble metals. Because the electrical potential for anodic dissolution of these metals is so low, insoluble anodes will not carry any appreciable current when connected to a common electrical bus with the soluble anodes. A case in point is copper electroplating from acid sulfate electrolytes. The present invention provides a means of dealing with the differential in anode and cathode efficiencies in such electroplating processes, since the current in the electrowinning cell can be set to the desired level by adjustment of its own rectifier. The current is therefore totally independent of the electrical potential existing in the electroplating cell.

For the same reason a further advantage is found with the present invention. Even with metals such as nickel, with the previous process the current density carried by the insoluble anodes will under normal circumstances be no more than the current density carried by the soluble anodes, and quite frequently will be appreciably lower. It is possible to operate the electrowinning cell according to the present invention at anode current densities well in excess of the anode current densities in the electroplating cell. As a result, the area of insoluble anodes required can be reduced to an amount significantly less than that required if the previous process were utilized. Other equipment can be reduced in proportion to the reduction in anode area. This will reduce the overall cost of the system.

BRIEF DESCRIPTION OF THE DRAWINGS

In order that the invention may be more clearly understood, reference will now be made to the accompanying drawings which illustrate particular preferred embodiments of the invention by way of example, and in which.

DESCRIPTION OF PREFERRED EMBODIMENTS

Figure 1:
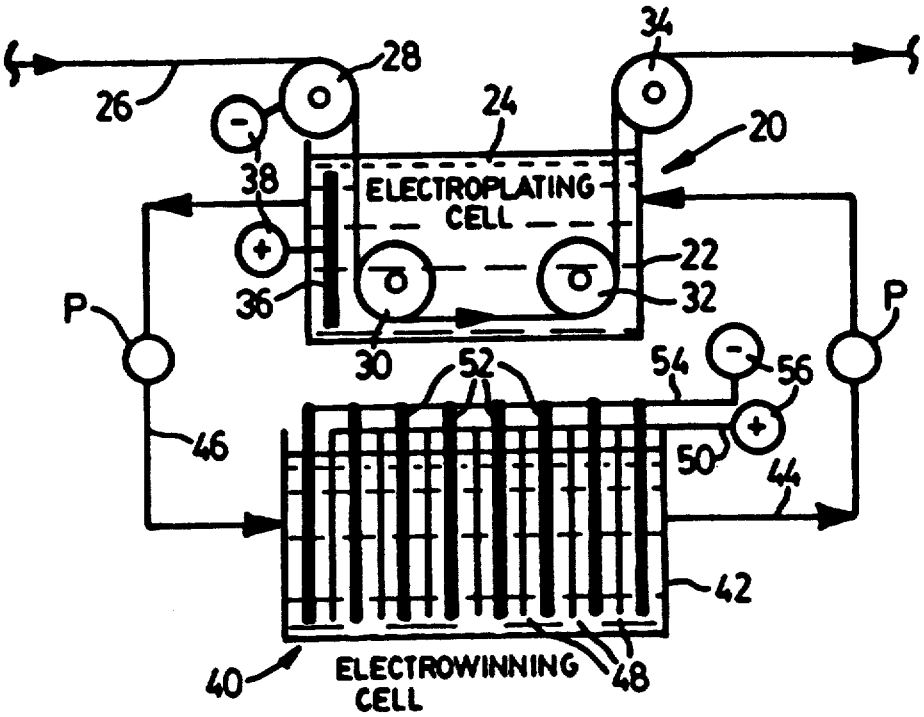
FIG. 1 is a diagrammatic illustration of an apparatus for performing the process of the present invention.

Referring to the drawings, FIG. 1 illustrates a process for continuously plating strip steel with a metal such as zinc, zinc-iron, or zinc-nickel alloy. The process is carried out in a electroplating cell which is generally indicated by reference numeral 20 and which includes a bath 22 containing a plating solution 24 of a metallic salt (e.g. a zinc salt). Steel strip to be plated is shown at 26 and is continuously conveyed through solution 24 around rollers generally indicated at 28, 30, 32 and 34. Bath 22 also includes a soluble metal anode 36 (e.g. of zinc).

A cathodic charge is imparted to the travelling steel strip 36 by connecting a source of direct electric current between strip roller 28 and anode 36, as indicated at 38. As is well known per se, metal from solution 24 is deposited on strip 26 as it travels through the solution. At the same time, metal is dissolved from anode 36 into solution 24. As discussed previously, a difference between anode and cathode current efficiency causes metal to dissolve from the anode faster than it plates onto the cathodic steel strip. This leads to a buildup in the concentration of dissolved metal in solution 24.

In accordance with the present invention, an electrowinning cell 40 is provided and includes a bath 42 which is connected to bath 22 of the electroplating cell by pipes indicated at 44 and 46 so that plating solution from bath 22 can be circulated through the bath 42 of the electrowinning cell 40. Pumps P are provided in both pipes for circulating the plating solution.

Cell 40 includes a series of insoluble anodes 48 connected to a common bus bar 50 and a series of intervening cathodes 52 connected to a common bus bar 54. A source of direct electric current separate from source 38 is connected across the anode and cathode bus bars 50, 54 as indicated at 56, so as to cause deposition of metal from the plating solution in bath 42 onto the cathodes 52. Plating solution is circulated between the cells while the amount of current flowing through the electrowinning cell is controlled so that the amount of the current which results in the deposition of metal is at least substantially equal to the amount of current flowing through the electroplating cell which results in the evolution of hydrogen gas. Consequently, the rate of metal deposition in the electrowinning cell 40 will be the same as the rate of dissolved metal buildup in the electroplating cell 20. In other words, metal buildup in the electroplating cell will be counteracted by a depletion of metal in the electrowinning cell.

The cathodes 52 of the electrowinning cell may be sheets of the metal being electroplated (e.g. zinc) or blank sheets of another metal such as stainless steel, titanium or aluminum, from which metal deposited can be easily stripped. As such, the metal can be recovered and re-used as anode material in the electroplating process, or sold to recoup its value.

The anodes 48 may be graphite, precious metal coated valve metal, precious metal coated ceramic materials, lead or a lead alloy.

If the cathode current efficiency in the electrowinning cell ($E_w$) is less than 100% the electrowinning current will have to be increased to compensate. The electrowinning current required in the electrowinning cell ($I_w$) can be calculated from the following equation.

$$I_w = \frac{(1 - E_p/100)\, I_p}{E_w/100} \qquad (1)$$

where, $E_p$=cathode efficiency in electroplating cell (%)

$E_w$=cathode efficiency in electrowinning cell (%)

$I_p$=current in electroplating cell (amp)

$I_w$=current in electrowinning cell (amp)

If the electrowinning cell current is too high, the metal concentration in the solution will decrease and the pH will drop. If the electrowinning cell current is too low, the metal concentration will still tend to rise and the pH will tend to rise, although not as quickly as would occur if no electrowinning cell were employed.

Under practical circumstances it may be difficult to adjust the electrowinning cell current to exactly the optimum level. The ideal effect can be obtained by adjusting the current up or down from time to time to maintain metal concentration and pH within acceptable limits. In this case, the average current through the electrowinning cell will be essentially the same as the amount of current flowing through the electroplating cell which results in the evolution of hydrogen at the cathode in the electroplating cell.

For a sulphate type plating solution, electrolysis of water at the insoluble anodes in the electrowinning cell will result in the generation of oxygen and sulfuric acid. This acid will neutralize the hydroxyl ions that are generated in the electroplating cell coincidental with the evolution of hydrogen at the cathode. A side benefit of this invention then is that it is no longer necessary to make regular additions of acid to the plating bath to counteract the tendency for the electroplating solution pH to rise.

The flow rate of solution circulated between the electroplating bath and the electrowinning cell is important. Preferably, the liquid is continuously circulated to avoid an increase in the metal concentration and pH in the electroplating cell. If the flow rate is too low, the pH in the electroplating cell may become too high and the pH in the electrowinning cell may become too low.

The minimum recirculation flow rate required is dependent on the following factors:

the current required in the electrowinning cell the maximum pH or minimum hydrogen ion concentration allowable in the electroplating bath, $[H]_p$ the minimum pH or maximum hydrogen ion concentration allowable in the electrowinning bath ($[H]_w$) that will allow deposition of metal at good cathode efficiency and good deposit quality. This minimum pH will depend on the composition of the solution, particularly, the standard electrode potential of the metal being deposited and its concentration as well as other factors such as the current density, temperature and the presence of chemical additives that will effect the morphology of the deposit.

the percentage cathode current efficiency in the electrowinning cell, $E_w$.

The minimum recirculation flow rate can be calculated from the following equation:

$$Q = \frac{3600(1 - E_p/100)\, I_p}{([H]_w - [H]_p)F} \qquad (2)$$

where,

F=Faraday's constant=96,500

$[H]_w$=maximum hydrogen concentration in electrowinning cell (N)

$[H]_p$=maximum hydrogen concentration in electroplating cell (N)

For example, in the case of zinc plating, the electroplating bath will operate at a pH of approximately 4 which corresponds to a hydrogen ion concentration of about [H]=0.0001 N. The minimum pH for efficient zinc electrowinning may be about 1.5, which corresponds to a hydrogen ion concentration of about

[H]=0.0316 N. The cathode current efficiency in the electroplating cell will be about 95%.

For an electroplating bath with a total current of 100,000 amperes the minimum flow rate required would then be calculated from the above equation as 6233 litres per hour.

The actual minimum pH for the electrowinning cell must be determined for each individual case as the conditions can vary quite widely. According to equation (2), the flow rate is strongly dependent on the acid concentration in the electrowinning cell. Normally the acid concentration in the electrowinning cell will be much higher than that in the electroplating cell, so that the minimum flow will be inversely proportional to the acid concentration in the electrowinning cell. This means that under normal conditions, the flow rate must be increased by a factor of 10 for each pH unit increase required in the electrowinning cell. In those cases where the electrowinning pH must be relatively high, the flow rate must be quite high.

Theoretically, there is no maximum allowable recirculation flow rate, although there are obviously practical limits to how much liquid can be reasonably pumped.

The current density employed in the electrowinning cell should be maximized while achieving as high a current efficiency as possible and producing an acceptable deposit. Although a smooth, adhering deposit would normally be considered ideal, under some circumstances, a powdery, loosely adhering deposit may be preferable. Electrowinning cells are available which are designed to handle production of such powders.

If chloride ion concentration in the plating solution is sufficiently high, chlorine gas will be generated at the anodes in the electrowinning cells in addition to, or instead of oxygen. In this case, the electrowinning cell design should make provision for the chlorine as the chloride ion is very corrosive to many anode materials and chlorine gas is extremely toxic. Anodes fabricated from graphite, precious metal coated valve metal such as iridium oxide coated titanium, or precious metal coated ceramic materials, which are resistant to chloride ions and chlorine can be employed.

Provision should also be made for collection of the chlorine gas evolved from the anode in the electrowinning cell in a safe manner. This can be accomplished by installing a hood over the electrowinning cell or over each individual anode.

Figure 2:
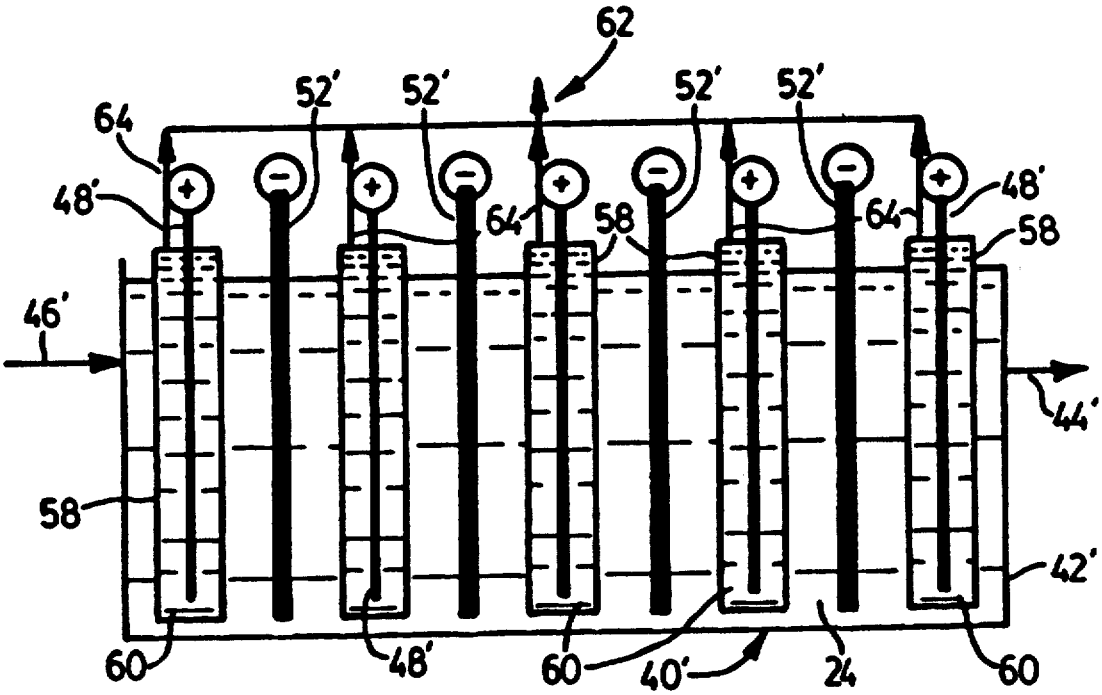
FIG. 2 is a diagrammatic illustration of a modified form of electrowinning cell for use in the process; and, FIG. 3 illustrates a modified form of the apparatus shown in FIG. 1 which permits recycling of "dragout" losses.

Alternatively, the anodes in the electrowinning cell can be enclosed in individual anode chambers or compartments formed by cation exchange membranes, as shown in FIG. 2. This view shows a modified form of the electrowinning cell of FIG. 1. In FIG. 2, primed reference numerals have been used to denote parts that correspond with parts shown in FIG. 1. A in that embodiment, the electrowinning cell 40' includes a series of anodes 48' and a series of intervening cathodes 52'. The anodes and cathodes are connected to respective bus bars but the bus bars have not been shown in FIG. 2.

Each of the anodes 48' is provided with an enclosure 58 formed by a cation exchange membrane. A sulfuric acid anolyte 60 surrounds the anode within enclosure 58. FIG. 2 also diagrammatically illustrates at 62 an oxygen or chlorine gas collection system that communicates with the interior of each of the enclosures 5 as indicated at 64. The enclosures 58 can be bags of membrane material with or without supporting frames.

The cation exchange membrane from which the enclosures 58 are made must be resistant to chlorine. An example of a suitable material is NAFION (TM), a product of E. I. Du Pont Co., Inc. This is a perfluorosulfonic acid type membrane. Dilute sulfuric acid, at a concentration of 0.1 N to 5, can be employed as an anolyte in the anode compartment. Use of a membrane anode compartment to separate the anolyte from the catholyte or plating solution in this manner will substantially reduce the quantity of chlorine gas produced at the anode. Although in principle there should be no chlorine gas produced if this technique is followed, the diffusion of small quantities of chloride ions through the cation membrane is unavoidable and in practice a limited amount of chlorine gas will be produced. This will necessitate provision for collection of the chlorine (system 62).

An additional benefit of using the ion exchange membrane for zinc/iron or other ferro-alloy plating solutions is that the iron contained in the plating solution does not contact the electrowinning anodes directly, thus preventing oxidation of iron from the divalent ferrous valence state to the trivalent ferric state. Ferric iron is undesirable in the electroplating process since cathodic reduction of iron from the trivalent state back to the divalent ferrous state consumes electrical energy which could otherwise be used for plating of metals.

Prevention of metal buildup in the electroplating solution also makes it possible to recycle so-called "dragout" losses.

Thus, as the steel strip leaves the electroplating bath a certain amount of plating solution adheres to the surface and must be subsequently rinsed off. This phenomenon is commonly referred to as "dragout". The metal salt content of the rinsewater represents a pollution hazard as well as a significant economic loss. It would be highly advantageous to recycle this rinsewater back to the plating bath. A number of processes including ion exchange, electro-dialysis and evaporation are available to facilitate recovery of the rinsewaters. Rinsewater recycle is normally not feasible, however, because recycle of metal back to the electroplating bath would merely serve to accelerate the rate of buildup of dissolved metal concentration. However, dragout recycle can be accommodated in the process of the invention, as shown in FIG. 3.

Figure 3:
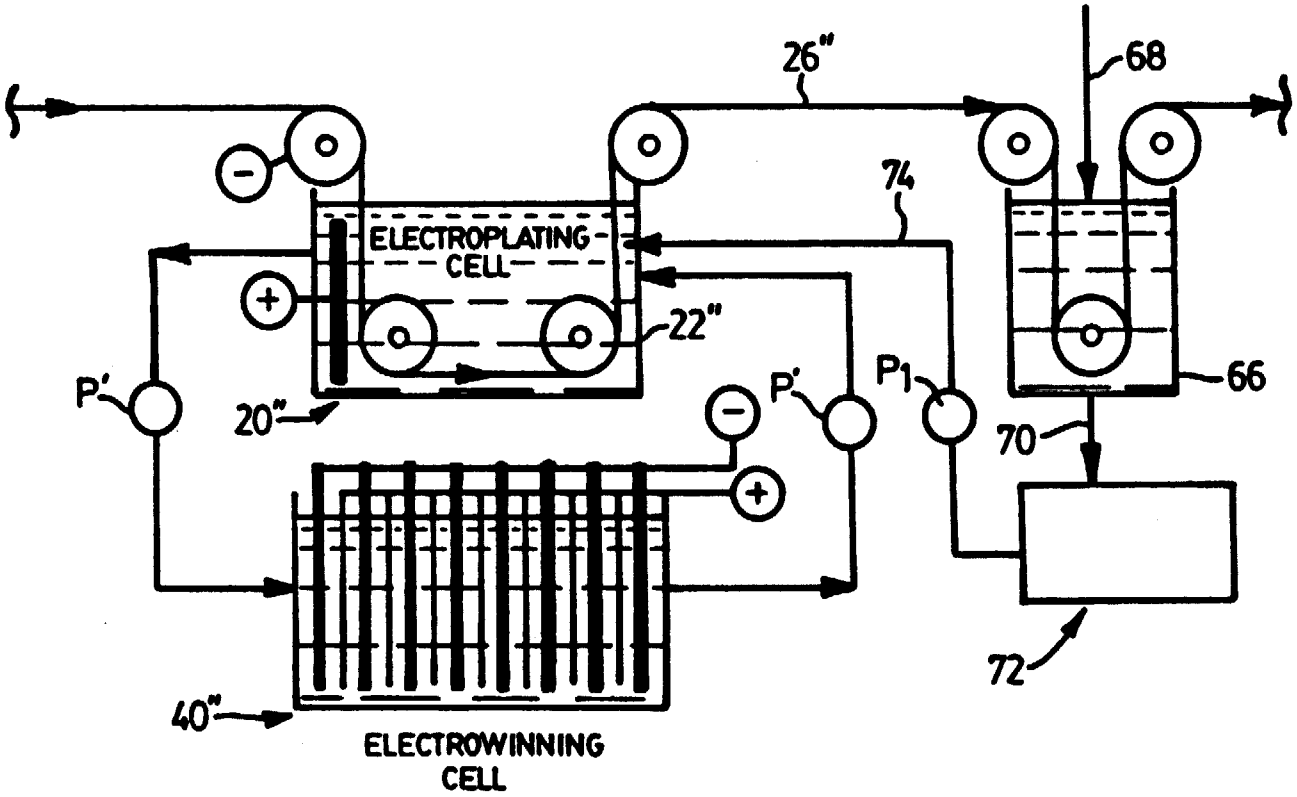

In FIG. 3, double primed reference numerals have been used to denote that correspond with parts shown in FIG. 1. The electroplating cell and the electrowinning cell are essentially the same as shown in FIG. 1 and are denoted respectively 20' and 40'. The steel strip 26', on leaving the electroplating cell, is lead through a rinse tank 66 for removal of "dragout" from the strip. Water is added to tank 66 as indicated at 68 and metal bearing rinsewater leaves the tank at 70 and is delivered to a recovery system 72. System 72 may comprise a conventional ion exchange, electro-dialysis or evaporation apparatus. Reclaimed rinsewater is returned from system 72 to the electroplating tank 22' through a line 74 which includes a pump $P_1$.

It will of course be appreciated that the preceding description relates to particular preferred embodiments of the invention and that many modifications are possible. For example, reference has been made to a process for electroplating certain specific metals and alloys but it is to be understood that the invention is not limited to these particular materials. Examples of other specific materials that may be plated are zinc, zinc/iron, nickel- /iron, zinc/nickel, tin/nickel, cadmium. The invention has particular advantages for plating metals that can exist in two valence states, such as iron, tin and copper. It is necessary to use a cation exchange membrane (FIG. 2) with such metals to avoid anodic oxidation to the higher valence state.

Referring specifically to the embodiment of FIG. 2, reference was made to the use of dilute sulphuric acid as an anolyte. It should be noted that any dilute strong acid can be used, e.g. sulphonic acid. The specific concentration of 0.1-5 N given in the disclosure is a preferred concentration range and is not essential.

I claim:

1. A process for electroplating metals in an electroplating cell which comprises a bath containing a plating solution of a metallic salt, a cathode comprising a workpiece to be plated, and a soluble anode, and in which the anode current efficiency of the cell is greater than the cathode current efficiency;

said process comprising the steps of:

providing an electrowinning cell which includes at least one insoluble anode, at least one insoluble cathode and a bath which communicates with the bath of said electroplating cell for permitting circulation of said plating solution between said cells;

connecting a source of direct electric current across the anode and cathode of said electroplating cell so as to cause electroplating of metal onto said workpiece;

circulating said plating solution between said cells;

connecting a source of direct current across said anode and cathode of the electrowinning cell so as to cause deposition of metal from said plating solution onto said cathode; and, controlling the amount of current flowing through the electrowinning cell which results in the deposition of metal to be at least substantially equal to the amount of current flowing through the electroplating cell which results in the evolution of hydrogen gas.

2. A process as claimed in claim 1, wherein said plating solution is continuously circulated between the electroplating cell and the electrowinning cell.

3. A process as claimed in claim 1, wherein the electrowinning cell includes a plurality of anodes, each of which is isolated from the plating solution by a cation exchange membrane which defines an anode compartment containing an anolyte comprising a dilute strong acid.

4. A process as claimed in claim 3, wherein the metal being plated is a metal that can exist in two valence states, wherein the lower valence state is preferred.

5. A process as claimed in claim 3, wherein said dilute strong acid is a sulfuric acid.

6. A process as claimed in claim 5, wherein the sulfuric acid anolyte has a concentration of 0.1-5 N.

7. A process as claimed in claim 3, wherein said cation exchange membrane is a cation permeable, perfluorosulfonic acid type membrane.

8. A process as claimed in claim 1, wherein the electrowinning cell includes a plurality of anodes which are made from materials selected from the group consisting of graphite, precious metal coated valve metal, precious metal coated ceramic material, lead and lead alloys.

9. A process as claimed in claim 1, comprising the further steps of: removing the cathode from the electroplating cell after electroplating has been completed; rinsing the cathode with water to remove dragout of said plating solution; treating said rinsewater to remove metal and produce reclaimed rinsewater; and recycling said reclaimed rinsewater to said electroplating cell.

10. An apparatus for electroplating metals comprising:

an electroplating cell including a bath for containing a plating solution of a metallic salt, a cathode comprising a workpiece to be plated, and a soluble anode, the anode current efficiency of said cell being greater than the cathode current efficiency;

an electrowinning cell which includes a bath [and], at least one insoluble anode; *and at least one insoluble cathode;* means for coupling said electroplating cell bath with said electrowinning cell bath for permitting circulation of said plating solution between said cells;

a source of direct electric current for connection across the anode and cathode of the electroplating cell for electroplating a metal onto said workpiece; [and,]

a source of direct current for connection across said anode and cathode of the electrowinning cell so as to cause deposition of metal from said plating solution onto said cathode[.]ep *; and,*

*means for controlling the amount of current flowing through the electrowinning cell which results in deposition of metal to be at least substantially equal to the amount of current flowing through the electroplating cell which results in the evolution of hydrogen gas.*

11. An apparatus as claimed in claim 10, further comprising means for continuously circulating said solution between the electroplating cell and the electrowinning cell.

12. An apparatus as claimed in claim 10, wherein the electrowinning cell includes a plurality of anodes, each of which is isolated from the plating solution in use by a cation exchange membrane which defines an anode compartment for containing an anolyte comprising a dilute strong acid.

13. An apparatus as claimed in claim 12, wherein said cation exchange membrane is a cation permeable, perfluorosulfonic acid type membrane.

14. An apparatus as claimed in claim 10, wherein the electrowinning cell includes a plurality of anodes which are made from materials selected from the group consisting of graphite, precious metal coated valve metal, precious metal coated ceramic material, lead and lead alloys.

15. An apparatus as claimed in claim 10, further comprising means for rinsing with water said cathode after removal thereof from said electroplating cell to remove dragout of plating solution from said cathode; means for treating said water after rinsing of said cathode, to remove metal therefrom and produce reclaimed rinsewater; and means for recycling said reclaimed rinsewater to said electroplating cell.

* * * * *